Aug. 13, 1968 R. M. DAVIDSON 3,396,589

FAST-ACTING REVERSIBLE FRICTION DRIVE MECHANISM

Filed Oct. 19, 1965 2 Sheets-Sheet 1

Inventor:
Richard M. Davidson

By Barry L. Clark
John C. Peele Jr. Attys

FAST-ACTING REVERSIBLE FRICTION DRIVE MECHANISM

Filed Oct. 19, 1965

2 Sheets-Sheet 2

Inventor:
Richard M. Davidson

By Barry L. Clark
John E. Recla Jr. Attys

United States Patent Office 3,396,589
Patented Aug. 13, 1968

3,396,589

FAST-ACTING REVERSIBLE FRICTION DRIVE MECHANISM

Richard M. Davidson, Northbrook, Ill., assignor to Bell & Howell Company, Chicago, Ill., a corporation of Illinois Filed Oct. 19, 1965, Ser. No. 497,971
9 Claims. (Cl. 74—202)

ABSTRACT OF THE DISCLOSURE

A drive transmission mechanism for transmitting to a rotationally reversible output shaft a sinusoidally varying torque derived from a unidirectional substantially constant torque motor. The motor continuously rotates a first roller in frictional engagement with a second roller on the drivable output shaft. Relative angular rotation between the axes of the rollers causes torque transmitted from the driven roller to the drivable roller to vary from a maximum, when the supporting shafts for the rollers are parallel, to a minimum when the shafts are essentially perpendicular to one another. To obtain a continuously varying sinusoidal torque curve, the motor driven shaft can be continually rotated by a second drive means.

The present invention relates to motors and the like. Particularly the invention relates to a reversible drive mechanism or motive means.

While reversible drive mechanisms have been heretofore known, great requirement for a rapidly reversible drive in connection with small, inexpensive motors has not made itself appreciably manifest until the advent of high speed recorders, for example, video tape recorders in which recording tape is motor drawn at high speeds in the interest of high reproduction quality. To minimize tape expense, a plurality of recording tracks (four is common) are provided on each length of recording tape. That is to say, in employment of four-track recording tape, a length or reel of such tape is moved past a recording head in one direction for recording in a first track. After the limit of that track has been reached, the direction of tape movement is reversed while it is drawn past the recording head for recording in the second track. Thereafter, the tape is run in the first direction past the recording head while recording occurs in the third track. Finally, at the end of the third track the recording head is engaged in the fourth track in which recording occurs while the tape is drawn in the direction opposite to the direction for recording in the first and third tracks.

When it is considered that conventional video tape is adapted to be moved at a rate of and has a normal recording speed of ten feet per second for suitable recording, the importance of minimizing recording interruption is apparent. Accordingly, the requirement for rapid reversal of tape reel drive as the end of each recording track is reached, to minimize the length of each change drive interruption, is appreciated.

While conventional reverse drive mechanisms have been found to be efficient for the intended uses to which they were put, such conventional devices are not adequate where high speed drive reversal is required, because of the relative clumsiness of the drive-reversing mechanisms. That is, prior devices, when considered within the framework of some present requirements, are too slow. Employing less efficient drive-reversing means than contemplated by the instant invention requires about several seconds to produce a drive reversal to desired speed.

During drive reversal motive torque is changed from machine speed in one rotational direction to machine speed in an opposite rotational direction. Between the two extremes, output torque reduces to zero from one direction and increases from zero in an opposite direction. This sequence of events is identified hereinafter as inversion of the drive, and the axis about which the motive torque mechanism is selectively rotatable is identified as the axis of inversion.

By providing means for controlling and applying torque during torque reversal, a sinusoidal drive may be produced in connection with a device hypothecated or in a mechanism adapted for rapid drive reversal. A sinusoidal drive may be employed in spectroscopy for sinusoidal rotation of a diffraction grating to cover a desired spectral interval.

In accordance with the instant invention, and as an object thereof, a motive mechanism is provided in which reversal of drive can be achieved in times measuring tenths of a second, perhaps as low as two tenths of a second.

Another object of the instant invention is the provision of parallel drive and driven shafts with co-acting torque transmission means, the shafts being adapted for relative inversion about a thereto normal axis, whereby the torque of the drive shaft drives the driven shaft in reverse directions.

A further object of the present invention is the provision of a reversible drive mechanism comprising parallel drive and driven shafts and torque transmission members arranged in variable torque transmission engagement and rotatable on axes disposed longitudinally of the drive and driven shafts, with one of said torque transmission members rockable about an axis of inversion through an angle of at least 180°, whereby the speed of the driven shaft can be varied over a range from full drive speed of the drive shaft to zero and reversed at a range of speeds from zero to full drive speed.

An additional object of the instant invention is the provision of a fast-acting reversible drive mechanism in which they are provided parallel drive and driven shafts supporting friction rollers in variable drive transmission engagement and rotatable about the axes of their respective shafts, whereby the driven shaft rotates at a speed of the drive shaft but in an opposite direction, and the drive shaft is rotatable about an axis perpendicular to the drive and driven shafts through an angle up to 180°, whereby the direction of the torque of the drive and driven shafts is reversed.

Still a further object of the invention is the provision of a fast-acting reversible drive which is characterized by a drive shaft, a driven shaft and a force transmission shaft, said shafts being disposed in parallel relationship and having thereon mounted peripherally engaged friction rollers rotating about axes provided by the respective shafts, the force transmission shaft being disposed medially of the drive and driven shafts, whereby upon inversion of said force transmission shaft about an axis perpendicular to said shafts the angular velocity of the driven shaft is varied.

Yet a further object of the present invention in the provision of an inexpensive and simple mechanism characterized by an invertable drive shaft having friction means in driving engagement with like means on an output shaft, the drive shaft being invertable about an axis perpendicular thereto to reverse the direction of its drive and the direction of the torque of the output shaft.

Moreover, it is an object of this invention to provide a reversible friction drive mechanism which applies a braking force on an output means to gradually slow it prior to the time of rotational direction change.

A still further object of the invention is to provide in a drive mechanism an improved torque transmission means for converting a drive torque of uniform velocity into a sinusoidally varying torque impressed on an output shaft.

The foregoing and other objects, features and advantages of the present invention will become more apparent upon consideration of the following description and appended claims, when considered in conjunction with the accompanying drawings wherein the same reference character or numeral refers to like or corresponding parts throughout the several views.

Figure 1:
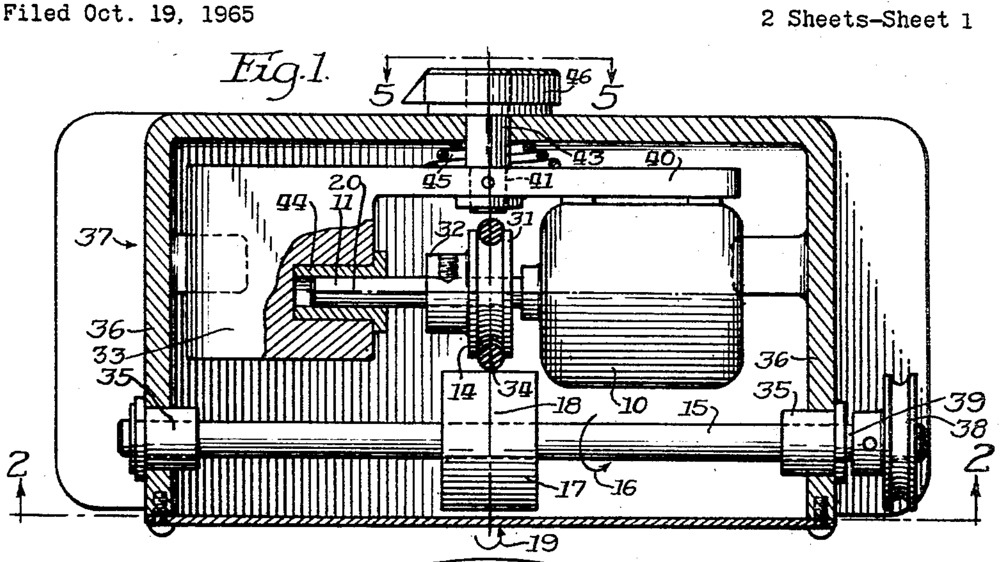
FIG. 1 is a sectional view in what may be considered a horizontal plane through the framework of a device embodying one form of the instant invention, parts shown in plan and parts broken away for the purpose of illustration.
Figure 2:
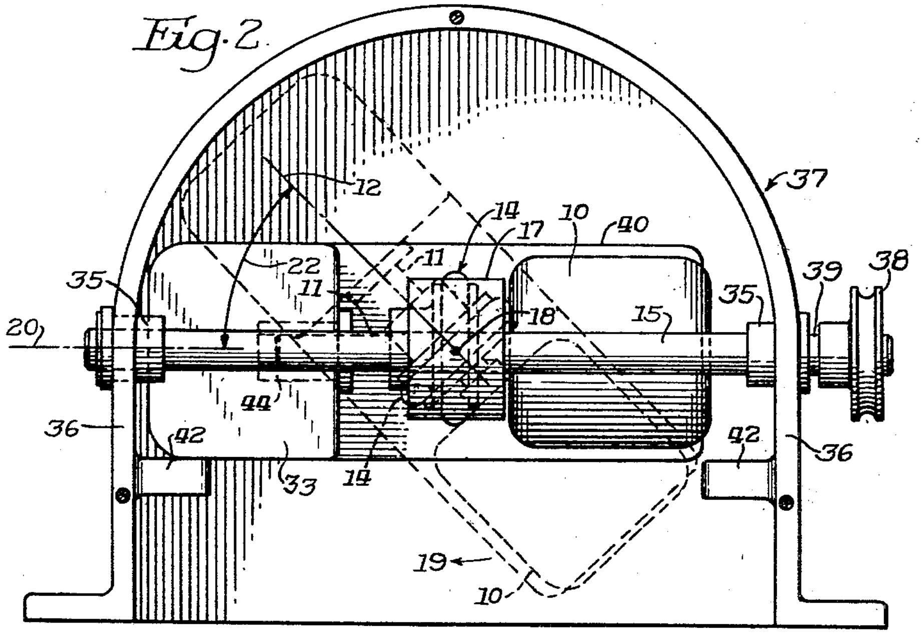
FIG. 2 is a view taken on the line 2—2 of FIG. 1 and looking in the direction of the arrows, however showing the motor rotated approximately 45° about the axis of shaft inversion in dotted lines.

Referring now more particularly to the embodiment shown in FIGS. 1 and 2, there is seen a motor 10 having projecting outwardly therefrom a motor or drive shaft 11 defining an axis of rotation which is identified by the numeral 12. For the purpose of this description, it shall be assumed that the motor shaft 11 rotates in the direction indicated by arrow 13, that is, clockwise when viewed looking in the direction of projection of drive shaft 11 from the motor 10. A roller or torque transmission member generally designated 14 is constrained for rotation with shaft 11 which provides an axis of rotation for said roller member.

As illustrated in FIG. 1, the roller member 14 may comprise a circumferentially grooved wheel 31 which is disposed concentric with shaft 11 and has a hub 32 which is shown secured to said shaft by means of a set screw. A ring 34 is mounted in the groove of said wheel 31 with a concentric peripheral part projecting therebeyond.

A driven or output shaft 15 which is parallel to shaft 11 has opposite portion journalled in a pair of opposed anti-friction bearing members 35 which are suitably supported in opposite sides 36 of the frame 37 of the device. The driven shaft 15 defines an elongated axis of rotation 20 about which the output or driven shaft 15 is rotatable counterclockwise, that is, in the direction indicated by arrow 16 to drive a pulley wheel 38 which is shown on mounted the output end portion 39 of, and constrained for rotation with, said driven shaft.

Rotation of the driven or output shaft 15 results from rotation of the torque transmission member 14, the periphery of which is in frictional engagement with the periphery of a roller or torque transmission member 17. The roller 17 is a cylindrical section which is rigidly secured on the driven or output shaft 15 for rotation therewith. Accordingly, when the torque transmission member 14 rotates in the direction of the arrow 13, the roller 17 will rotate in the direction of the arrow 16, carrying therewith the driven or output shaft.

As illustrated in FIGS. 1 and 2, the ring 34 and the roller 17 lie in a common plane which is normal to the parallel drive and driven shafts 11 and 15. Furthermore, said ring 34 and roller 17 are fabricated preferably of an elastomer, such as rubber or the like, having an exceedingly high coefficient of friction, whereby under normal load conditions the rollers are conditioned for positive drive.

The motor 10 may be carried on one end portion of an elongated mount 40 which is constrained for rocking with a shaft 41 the axis of which is normal to the longitudinal axis of said mount. The shaft 41 provides for said mount and said motor an axis of inversion which is represented by a line designated 18. The axis of inversion intersects the axes of rotation of the drive shaft 11 and of the driven shaft 15 normally, that is, at right angles, said axis of inversion 18 preferably falling midway between the opposite end faces of the said ring 34 and the roller 17. In the embodiment of the invention illustrated, the direction of inversional rotation may be considered to be as shown by arrow 19 in FIGS. 1 and 2.

While the motor 10 may be mounted for inversion about axis 18 to any desired angle by provision of means which will be apparent to those skilled in the art, the embodiment of the invention illustrated in FIGS. 1 and 2 limits inversion to 180° in the direction of arrow 19 from the solid line condition shown in FIG. 2. Limitation of inversion is by reason of a pair of opposed bosses 42 which are secured to opposite frame sides 36 in horizontally aligned positions and are adapted for engagement of an extension 33 from one end of motor mount 40. As illustrated, the length of mount 40 is such that upon inversion, the motor 10 will clear said bosses but the extension will not clear.

Attention is invited to the character of the design of the embodiment of the invention illustrated in FIGS. 1 and 2 which provides anti-friction bearing member 44 mounted in the extension 33 in which the outer end of shaft 11 is journalled.

In accordance with the present invention, the torque transmission members 14 and 17 are arranged in a manner such that they are maintained in continuous bearing or frictional relationship. Accordingly, the motor 10 will always be in driving relationship with the output or driven shaft, except as indicated to the contrary hereinafter.

However, the relative speeds of the shafts 15 and 11 will not always be the same. That is to say, while the speed of the shaft 11 is constant the speed of shaft 15 will vary as a function of the angle of inversion. The speed of the output or driven shaft will vary from the speed of drive shaft 11 according to the following formula: $W_1 = -W_2 \cos \theta$, in which $W_1$ is the angular velocity of the driven or output shaft 15, $W_2$ is the angular velocity of the drive shaft 11 and $\theta$ is the angle 22 at which shaft 11 is disposed relative to shaft 15 or to which said shaft 15 has been rotated about its axis of inversion 18 from a position parallel to shaft 15. It is apparent, by having reference to the formula, that when the shafts 11 and 15 are parallel, the angular velocity of said shafts will be equal but the directions of their respective torques opposite to each other. Furthermore, it is apparent that as angle $\theta$, that is, angle 22, approaches 90°, the angular velocity of the output shaft 15 will gradually decrease so that when said angle 22 is 90° the velocity of shaft 15 will be zero regardless of the velocity of shaft 11.

By having reference to FIG. 2, it is readily appreciated that if the motor 10 were rotated 90° about its axis of inversion from the position of FIG. 1, the axis of rotation of the ring 34 would be at right angles to the axis of rotation of the roller 17, and , although said ring 34 and roller 17 would be engaged, the roller 17 could not be driven. As the inversion of the motor 10 and shaft 11 pass 90° from the parallel, that is, 90° from the position of FIG. 1, the directions of the shafts change relative to FIG. 1 by reason of the inversion, and the angular velocity of the driven or output shaft 15 will increase gradually as the angle 22 increases until angle 22 is 180°, at which time the speeds of the output or driven shaft 15 and of the motor shaft 11 will again be the same as each other, as is apparent by reference to the above formula.

Further inversion of the shaft 11 about the axis 18 beyond 180° will result in gradual reduction in the speed of the driven shaft 15 to zero velocity when the angle 22 is 270° beyond which angle the directions of rotation of the shafts 11 and 15 again reverse. That is to say, while the angle 22 is between 90° and 270° from the position illustrated in FIG. 1, the direction of the arrows 13 and 16 will be reversed. As the angle 22 increases from 90° to 180°, the angular velocity of the shaft 15 increases proportionately from zero to a velocity equal to that of the shaft 11. As the angle 22 increases from 180° to 270°, the angular velocity of the shaft 15 decreases from the velocity of the shaft 11 to zero in inverse proportion to the increase in the angle 22. In the two quadrants covered as the angle of inversion lies between 270° and 90° from the position of FIG. 1, the reverse will occur to that described when angle 22 lies between 90° and 270°.

The combination heretofore described provides means for conversion of a torque of constant velocity into a torque of variable velocity with precise control. The torque transmission means 14 serves as a brake whose effect is a function of its angle of inversion according to the aforestated formula. Considering the velocity of angular rotation of the output shaft in relation to the angle of inversion of the drive shaft 11 graphically, as in FIG. 4, it is seen that the velocity of the output shaft varies sinusoidally as a function of the angle of inversion.

Figure 5:
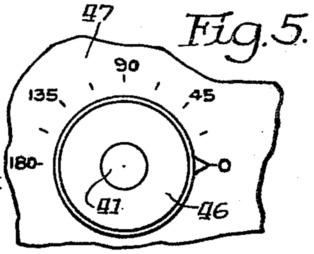
FIG. 5 is an elevational view of a fragment of the device shown in FIG. 1 and taken on line 5—5 of FIG. 1 and looking in the direction of the arrows to illustrate a mechanism for controlling output velocity.

As a consequence, not only can the direction of output drive be reversed rapidly (by merely inverting motor 10 180° in the embodiment of FIGS. 1 and 2) but also the invention can be employed to procure selected of a range of output velocities relative to input velocity and also as a generator of sinusodial motion. Means to effectuate the former are illustrated in FIGS. 1, 2 and 5 will be defined in the description next ensuing. Means for the latter will be described thereafter.

As illustrated in FIG. 1, the shaft 41 is journalled in a sleeve 43 which projects through the top portion of frame 37. To stabilize the motor 10, that is to minimize vibration thereof, a compression spring 45 is mounted about sleeve 43 with its opposite ends bearing against the interior of frame 37 and motor mount 40. An indicator 46 which is constrained for rotation with shaft 41 is arranged about the outer end of sleeve 43 adjacent a scale 47 which is graduated in angular degrees about shaft 41 on the outer or visible surface of the upper portion of frame 37, as illustrated in FIG. 5. The indicator is preset on the shaft to designate 0° on the scale when the motor 10 is conditioned as in solid lines in FIGS. 1 and 2. If desired means which will be apparent may be provided to releaseably lock the mount 40 at any desired angle of inversion between 0° and 180° in the embodiment illustrated in FIGS. 1 and 2. Inasmuch as there is for each angle of inversion in a quadrant a corresponding angular output velocity relative to the angular speed of shaft 11, the device can be adjusted for selected output shaft speeds as well as angular direction.

Figures 3, 4:
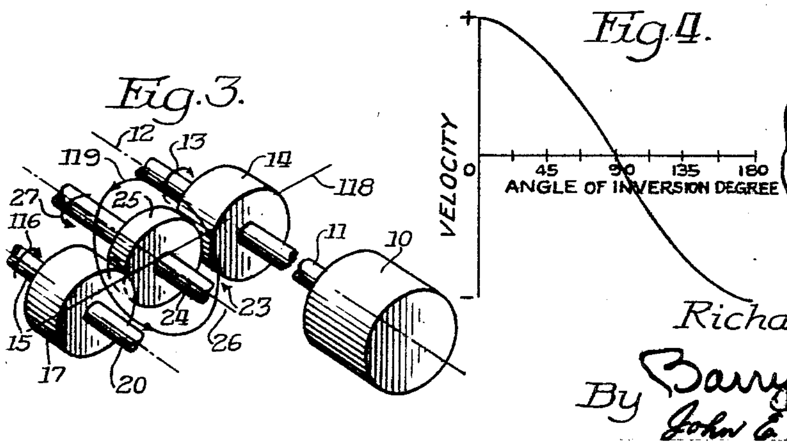
FIG. 3 is a diagrammatic perspective view of another embodiment of the invention.
FIG. 4 is a graphic representation of the angular velocity and rotational direction of an output shaft of said embodiments in relation to the angular inversion of its associated input shaft.

The modified embodiment of the invention shown in FIG. 3 is preferred when it is desirable to quickly change or vary output speeds without affecting direction of output torque. To such end, the torque transmission members or rollers 14 and 17 are spaced apart longitudinally of the axis of inversion 118, and a separate change speed or velocity adjustment member generally designated 23 is employed.

The change speed or velocity adjustment member 23 comprises an exceedingly short intermediate or stub shaft or pin 24 on which there is mounted a roller 25. The roller 25 is a cylindrical section which is fast on the intermediate shaft 24 for rotation about a longitudinal axis 26 is defined by the said shaft 24. Like the torque transmission members or rollers 14 and 27, the roller 25 is fabricated from a material characterized by an exceedingly high coefficient of friction, whereby positive force transmission between the rollers 14, 25 and 17 is assured. The intermediate shaft 24 is journalled for rotation about the axis 26, and its mounting (not shown) provides for rocking of said change speed member 23 about the axis of inversion 118. While the change speed member 23 can be adapted for inversional rotation in either direction about the axis 118, it is assumed for the purpose of the instant description that the direction of inversional rotation is that shown by the arrow 119.

The intermediate shaft 24 is disposed in parallel relationship to the drive and driven shafts 11 and 15. Furthermore, when the shaft 24 is disposed as illustrated in FIG. 3, it lies in the same plane as do the shafts 11 and 15. Thereby, the axis of inversion 118 is perpendicular to all of said shafts 11, 24 and 15. Moreover, the axis of inversion 118 lies preferably midway between the opposite end faces of the cylindrical section defining said roller 25.

As the drive shaft 11 rotates in the direction of arrow 13, roller 25 will be rotated about axis 26 in the direction of arrow 27, the direction of arrow 27 being opposite to the direction of arrow 13. On the other hand, the direction of the output or driven shaft 15 will be as shown by arrow 116 in FIG. 3. That is to say, the direction of arrow 116 is opposite to the direction of arrow 27, however the same as the direction of arrow 13. In such regard, it is observed that the directions of rotation of the drive shaft 11 and the driven shaft 15 in the embodiment illustrated in FIG. 1 are opposite to each other, whereas, in the embodiment in FIG. 3 the directions of rotation of the shafts 11 and 15 are the same.

In the embodiment of the invention illustrated in FIG. 3, an easy means is provided for varying the speed of the driven shaft 15 without the requirement for inverting the motor 10 or the drive shaft 11. By rocking of the velocity adjustment means 23 about axis 118, the need to move the motor 10 assembly for such control, as is the case employing the embodiment of FIG. 1, is obviated. The angular setting of shaft 24 about the axis of inversion 118 will control driven or output shaft velocity, and, accordingly, for a desired driven or output velocity, a specific angular setting of shaft 24 is required which can be determined from the formula: $W_1 = W_2 \cos A \cos B$, in which $W_1$ is the angular velocity of the driven or output shaft 15, $W_2$ is the angular velocity of the motor shaft 11, A is the angle at which the shafts 24 and 11 are disposed with respect to each other about the axis of inversion 118, and B is the angle at which the shafts 24 and 15 are disposed with respect to each other about said axis of inversion. Accordingly, should it be desired to vary the velocity of the output shaft 15, only the shaft 24 requires rotation about the axis of inversion 118, and such variation may be achieved manually by moving a member (not shown) and connected to shaft 24 along a scale calibrated in terms of velocity of the output shaft 15 in a manner which will be evident to those knowledgeable in the art.

Figure 6:
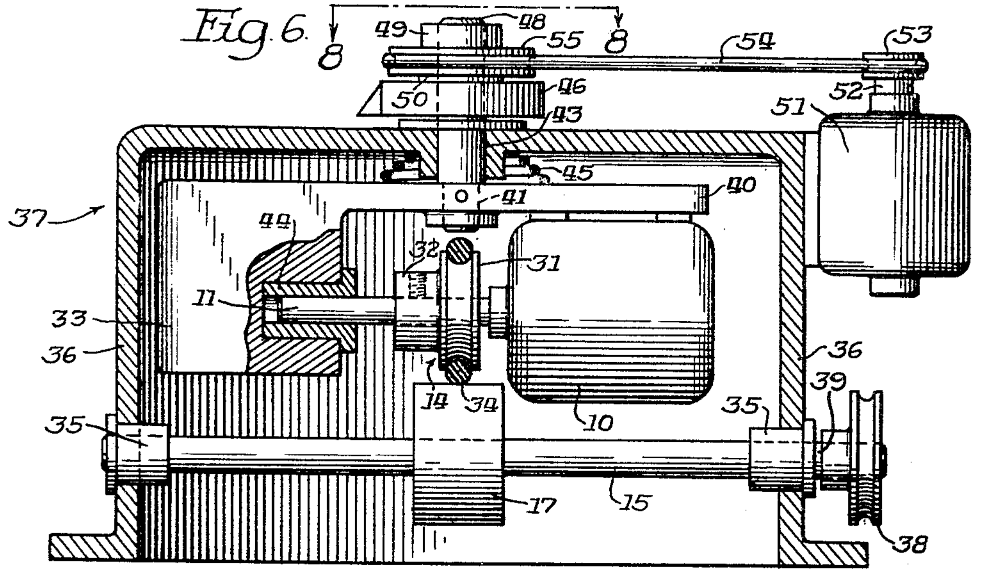
FIG. 6 is a sectional view in what may be considered a vertical plane through the framework of a device embodying yet another form of the invention, parts being shown in plan and parts broken away for the purpose of illustration.
Figures 7, 8:
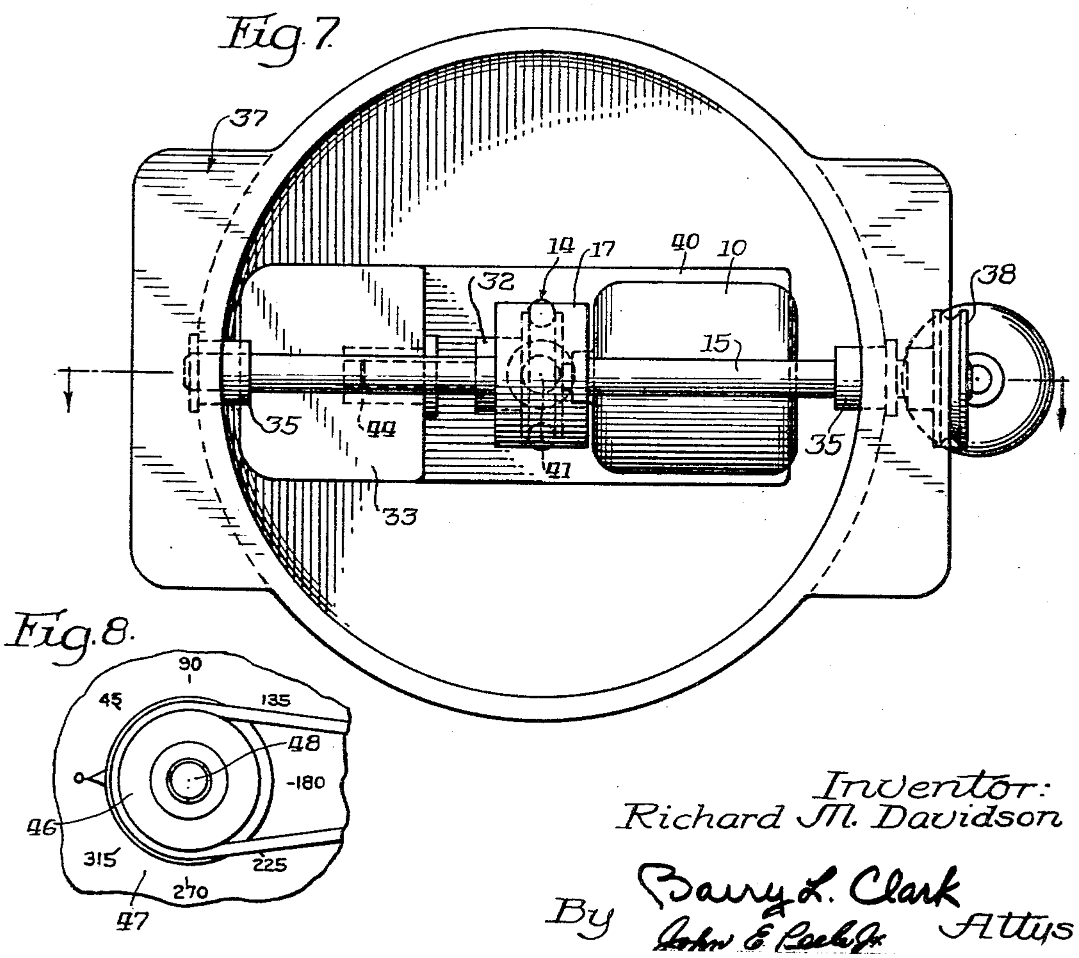
FIG. 7 is a view looking at the bottom of FIG. 6.
FIG. 8 is an elevational view of a fragment of the device shown in FIG. 6 and taken on line 8—8 of FIG. 6 and looking in the direction of the arrows to illustrate a mechanism employed to determine angular output velocity.

In the embodiment illustrated in FIGS. 6, 7 and 8, the invention is adapted for sinusoidal motivation through pulley 38. To that end, the bosses 42 which are employed in FIGS. 1 and 2 are omitted in FIGS. 6 and 7. As a result, motor 10 is free for continuous inversion through repeated 360° cycles. For that purpose, the shaft 41 may have an outward extension 48 beyond the indicator 46. A pulley wheel 55 constrained for rotation with said shaft 41 is arranged concentric with extension 48, said pulley wheel shown as being retained between a fixed collar 49 and a ring 50 which serves to space said pulley wheel from the indicator 46.

A motor 51 which may be secured to frame 37 by any suitable means is adapted to continuously drive shaft 41 by means of a pulley belt 54 which operably engages the pulley wheel 55 and a pulley wheel 53 which is constrained for rotation with the output shaft 52 of the motor 51. As the shaft 41 rotates, the pulley 38 which is constrained for rotation with shaft 15 will rock reversibly and at varying velocities through 180°.

As many substitutions or changes could be made in the above described construction, and as many apparently widely different embodiments of the invention within the scope of the claims could be constructed without departing from the scope and spirit thereof, it is intended that all matter contained in the accompanying specification shall be interpreted as being illustrative and not in a limited sense.

The embodiments of the invention in which an exclusive property or privilege is claimed are defined as follows:

1. In a reversible drive construction the combination of a unidirectional operable motor and a motor shaft extending outwardly from said motor in a first plane, and defining an axis, a drivable shaft disposed in a plane parallel to the plane of said motor shaft and defining an axis;

torque transmission means arranged for transmitting torque between said motor shaft and said drivable shaft for substantially continuous application of motor torque to said drivable shaft, and mounting means supporting said motor and said drivable shafts for relative angular inversion about an axis normal to the plane of said motor and said drivable shafts, said relative inversion of said shafts resulting in a change of rotational direction of said drivable shaft as the axes of said shafts depart from perpendicularity with one another.

2. The reversible drive construction defined in claim 1 in which the torque transmission means comprises a pair of members constrained for rotation with said motor and drivable shafts, respectively, and in frictional engagement with each other, and arranged to transmit motor shaft torque to said drivable shaft when said shafts are oriented out of perpendicularity with one another.

3. The reversible drive construction defined in claim 1 in which the torque transmission means comprises a pair of rollers disposed in a plane defined by the axis of inversion at each angle thereof, said rollers being secured to said shafts and arranged in frictional drive transmission relationship on said shafts, respectively, at substantially all angles of inversion.

4. In a drive speed change mechanism and the like, the combination of a motor and a unidirectional operable motor shaft extending outwardly from said motor with a drivable shaft disposed in a plane parallel to the plane of said motor shaft;

a speed change shaft disposed between and in a plane parallel to the planes of said motor shaft and said drivable shaft;

torque transmission means for applying the torque of the motor shaft to the speed change shaft and the torque of the speed change shaft to the drivable shaft, and mounting means supporting one of said shafts for angular inversion about an axis normal to all of said shafts, angular inversion of said one shaft through 90° adapted to cause variation in the angular velocity of the drivable shaft in a range between motor speed and zero.

5. The drive speed change mechanism defined in claim 4 in which the torque transmission means comprise a plurality of rollers mounted on said shafts, respectively, with the rollers of the motor and drivable shafts being frictionally engaged with the roller on said speed change shaft at all angles of inversion.

6. In a drive speed change construction having a motor and a torque output member, a first torque transmission member arranged for rotation by said motor about a first axis of rotation;

a second torque transmission member in drive transmission relationship with said first torque transmission member and rotatable thereby about a second axis of rotation and in a plane parallel to the plane of the first axis of rotation to motivate said output member;

means defining an axis normal to the first and second axes of rotation and about which said first and second torque transmission members are relatively invertible;

means for maintaining drive transmission relationship between said first and second torque transmission members at substantially all angles of inversion, whereupon relative inversion of said torque transmission members through 90° the output member rotates at variable angular velocities between motor speed and zero.

7. A motor device for conversion of a unidirectional input torque to a torque varying sinusoidally as to direction and angular velocity and comprising input mover means for developing a unidirectional torque;

first rotational means arranged for rotation by said mover means about a first axis;

sinusoidal torque output means;

second rotational means arranged for rotation of said output means about a second axis parallel to the first axis;

means for relatively inverting said first and second rotational means about a third axis parallel to the first and second axes, and means for maintaining driving relationship between said first and second rotational means to drive said output shaft sinusoidally as a function of the relative inversion of said rotational means as said first rotational means rotates.

8. The reversible drive construction defined in claim 1 including drive means connected to one of said shafts to continuously vary the relative angle between said shafts wherein said motor shaft input is a constant torque and said drivable shaft output torque is sinusoidally varying as to direction and velocity as said shafts are rotated.

9. The reversible drive construction defined in claim 8 wherein said drive means continuously rotate said motor and motor shaft relative to said drivable shaft.

References Cited

UNITED STATES PATENTS

| | | | |
|---|---|---|---|
| 1,193,448 | 8/1916 | Ashton et al. | 74—198 |
| 1,701,582 | 2/1929 | Mengden | 74—198 |
| 2,668,059 | 2/1954 | Roberts | 74—202 |
| 2,737,820 | 3/1956 | Collar | 74—198 |

FRED C. MATTERN, Jr., *Primary Examiner.*

C. J. HUSAR, *Assistant Examiner.*